United States Patent [19]
Cartellone

[11] Patent Number: 5,413,445
[45] Date of Patent: May 9, 1995

[54] END LINK AND SWIVEL ASSEMBLIES FOR CHAINCABLES

[75] Inventor: Gerardo Cartellone, Mendoza, Argentina

[73] Assignee: Aceros Cartellone, S.A., Mendoza, Argentina

[21] Appl. No.: 976,694

[22] Filed: Nov. 13, 1992

[30] Foreign Application Priority Data

Nov. 22, 1991 [AR] Argentina ............... 321.216

[51] Int. Cl.⁶ .............. F16B 23/00; F16B 35/04; B66C 1/00
[52] U.S. Cl. .................. 411/400; 411/411; 411/366; 411/436; 294/89
[58] Field of Search ........... 411/400, 366, 411, 424, 411/426, 436; 294/89, 91

[56] References Cited

U.S. PATENT DOCUMENTS

| | | | |
|---|---|---|---|
| 3,258,284 | 6/1966 | Phipps | 411/411 X |
| 3,394,626 | 7/1968 | Oliver | 411/411 |
| 4,040,756 | 8/1977 | Donegan | 411/411 X |
| 4,074,519 | 2/1978 | Garrett | 411/400 |
| 4,290,638 | 9/1981 | Manning | 294/89 |
| 4,325,575 | 4/1982 | Holt et al. | 294/89 |
| 4,906,151 | 3/1990 | Kubis | 411/411 X |

Primary Examiner—Neill R. Wilson
Attorney, Agent, or Firm—Darby & Darby

[57] ABSTRACT

An end link and swivel assembly for chaincables, wherein the end link comprises a drilled head followed by a threaded pin which is rotatingly mounted on a passage formed at the link and secured by an adjusting nut. The pin and nut threads are of the rounded corner type, wherein between the pitches and roots thereof essentially planar flank regions as contact surfaces are defined. Therefore, the pin and nut may be manufactured by casting.

7 Claims, 1 Drawing Sheet

END LINK AND SWIVEL ASSEMBLIES FOR CHAINCABLES

FIELD OF THE INVENTION

The instant invention relates to improvements in end link and swivel assemblies for chaincables, particularly to improvements in the threads used in such links.

BACKGROUND OF THE INVENTION—PRIOR ART

The object of these links is allowing free rotation of the chain in order to prevent twisting and thus permitting the work when being properly tensioned.

As already known, such links are comprised by a female part, a male part and a nut. Rotary attachment is attained between the female and the male with their nut. Thus, the nut threaded onto the male portion is then released in order to prevent unthreading during working, with the resulting loss of the chaincable and anchor.

It is already known, in the manufacture and use of swivels for chaincables, that the engagement between the nut and the male rod is actually established by means of threads requiring an expensive and thorough machining process, one of the threads used being the "ACME American thread of reduced height".

In spite of the efficiency of this arrangement, its manufacturing has a high final cost due to its particular features; this has been one of the basic reasons of the research giving as a result the improvements object of the instant invention, resulting in a substantial reduction of the mentioned cost of the finished product. Further, such improvements are based on technical merits, duly proven in corresponding tests.

In order to illustrate the advantages of the instant invention, the same will be hereinbelow described in connection with a preferred embodiment which in no way is intended as a limitation of the scope of the invention.

BRIEF DESCRIPTION OF THE DRAWINGS

In the drawings, the same reference symbols designate the same or corresponding parts.

DETAILED DESCRIPTION OF THE INVENTION

As shown in the attached drawings, the improved end link and swivel assembly for chaincables, in which cast threads constituting the essential inventive feature are included comprises, as usual, a female swivel I with a widening 1 having a channel suitable for being rotatingly adapted on the threaded end rod 2 of a male end II which further comprises a drilled head 3 which by means of a nut III accomplishes the rotary engagement of the swivel I on the rod 2.

Figures 1, 2:
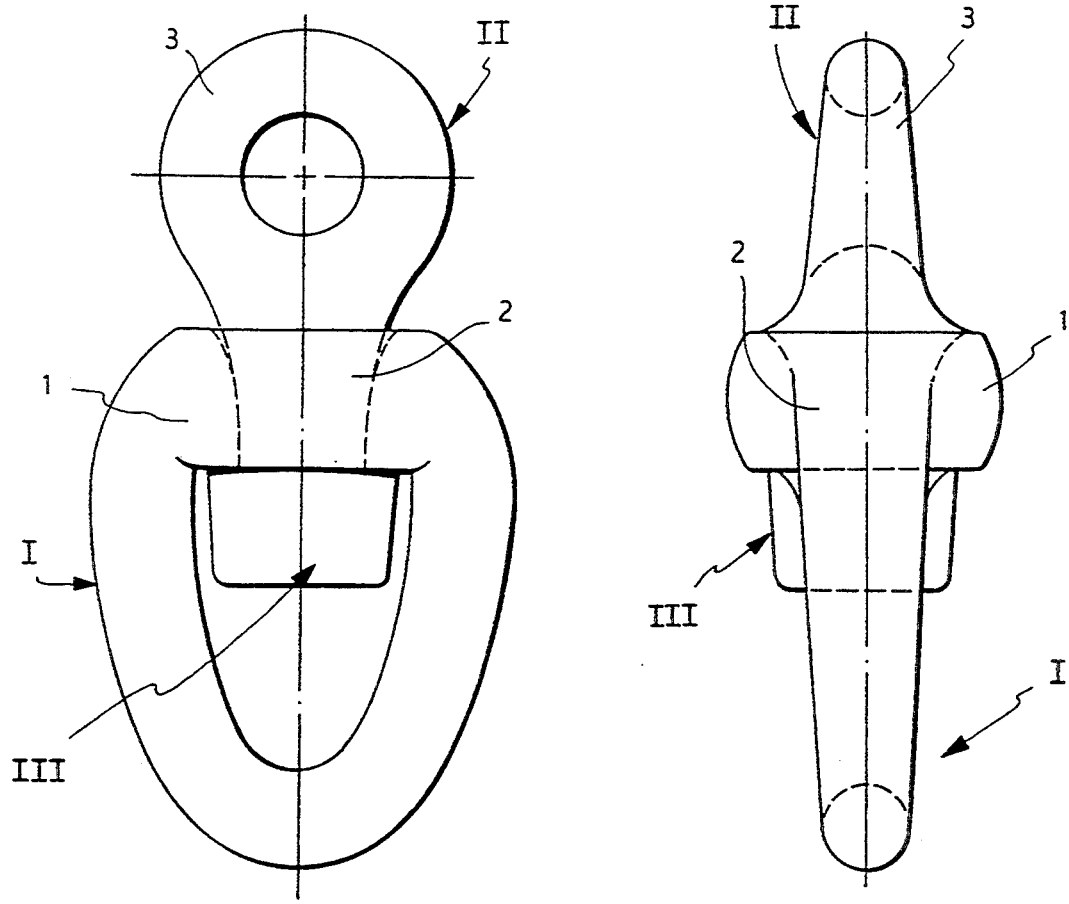
FIG. 1 is a schematic front elevational view of an assembly containing the improvements of the invention.
FIG. 2 is a side elevational view complementing FIG. 1.
Figure 3:
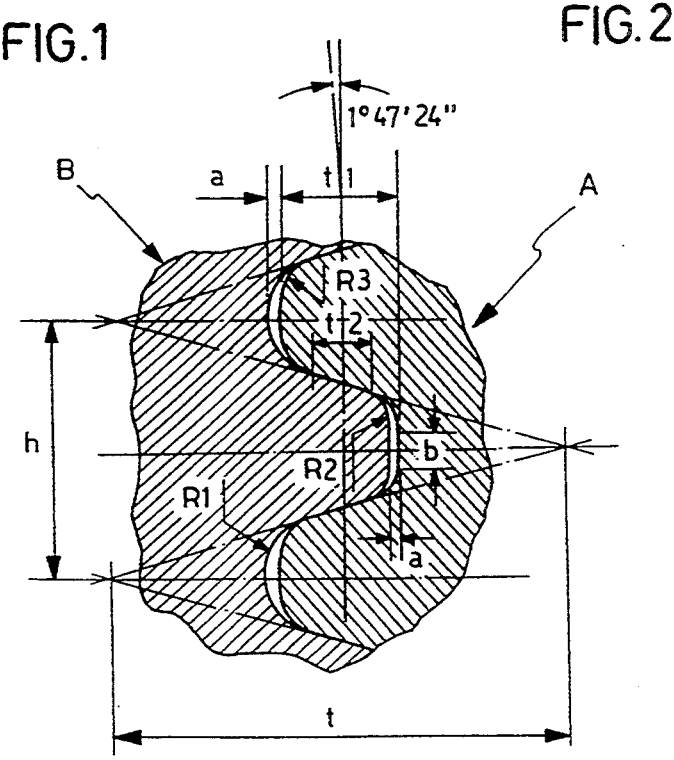
FIG. 3 is partial schematic section of a thread according to the instant invention.

This general arrangement is that shown schematically in FIGS. 1 and 2, FIG. 3 showing the essential feature of the invention comprised by a particular thread whose use is supported by technical as well as by economic reasons.

Since the thread should be a cast thread, the selected thread is that allowing molten metal slippage, i.e. allowing smooth section changes as is the case with a rounded thread (e.g. DIN 405), without sharp changes.

Since DIN 405 thread is not used for force transmission equipment, the contact surface between the sides is increased, thus increasing the "flattening" section therebetween.

According to the invention, the thread has a tapered shape for facilitating mounting and providing adjustment without decreasing the thread strength. Preferably, the tapering used is 1:16, the same as that of tapered tubes thread; said tapering could have other values according to the specific requirements.

Values shown in FIG. 3, in which A is the screw and B the corresponding nut, represent the rounded thread used in the instant invention and developed as per the following calculations:

$$H = \frac{25.40095}{Z}$$

$$t = 1.86603 \cdot h$$
$$t^1 = 0.5 \cdot h$$
$$t^2 = 0.25 \cdot h$$
$$a = 0.05 \cdot h$$
$$b = 0.10721 \cdot h$$
$$R^1 = 0.22414 \cdot h$$
$$R^2 = 0.10119 \cdot h$$
$$R^3 = 0.16865 \cdot h$$

In the previous calculation: Z represents threads per inch; h is the notch, which is the distance between two consecutive threads t is the height of the profile; $t^1$ is the height between the phantom pitch line and that of the roots; $t^2$ is the flank contact height; a is the gap or space between the top of the nut thread and root, the top of the nut thread; b is the width without curvature of the screw thread root; $R^1$ represents the joining radii between the channel and flanks of the nut; $R^2$ corresponds in turn to the joining radii between each top and flanks of said nut; the $R^3$ represents the joining radii between each top and flanks of the screw.

I claim:

1. An end link and swivel assembly comprising:
   an end link having a threaded end rod; an adjusting nut being engaged with said threaded end rod, wherein said rod and said nut of the assembly being manufactured by casting, said rod and said nut having a threaded coupling region wherein said rod and nut threads having rounded thread corners; said rod and nut threads having flank surfaces that are substantially planar and thus form relatively long contact surfaces therebetween, said rod having a root surface that is substantially planar.

2. An end link and swivel assembly as claimed in claim 1, wherein said rounded thread corners are developed according to the following calculation:

$$H = \frac{25.40095}{Z}$$

$$t = 1.86603 \cdot h$$
$$t^1 = 0.5 \cdot h$$
$$t^2 = 0.25 \cdot h$$
$$a = 0.05 \cdot h$$
$$b = 0.10721 \cdot h$$
$$R^1 = 0.22414 \cdot h$$
$$R^2 = 0.10119 \cdot h$$
$$R^3 = 0.16865 \cdot h$$

wherein: Z represents threads per inch; h is the pitch, which is the distance between two consecutive threads; t is the height of the profile; $t^2$ is the flank contact height; a is the gap or space between the tip of the nut thread and root of the rod thread; b is the width without curvature of the screw thread root; $R^1$ represents the joining radii between the channel and sides of the nut; $R^2$ corresponds in turn to the joining radii between each tip and flanks of said nut; and $R^3$ represent the joining radii between each tip and flanks of the screw.

3. An end link and swivel assembly, as claimed in claim 1, wherein said rounded thread corners have a tapering of 1:16.

4. An end link and swivel assembly, as claimed in claim 1, wherein said rod and nut are manufactured by steel shell molding casting.

5. An end link and swivel assembly, as claimed in claim 2, wherein said rounded thread corners have a tapering of 1:16.

6. An end link and swivel assembly, as claimed in claim 2, wherein said rod and nut are manufactured by steel shell molding casting.

7. An end link and swivel assembly, as claimed in claim 3, wherein said rod and nut are manufactured by steel shell molding casting.

* * * * *